(12) United States Patent
Kidman et al.

(10) Patent No.: US 7,503,589 B2
(45) Date of Patent: Mar. 17, 2009

(54) CONNECTOR ASSEMBLY AND METHOD FOR CONNECTING HOSES

(75) Inventors: Beau Kidman, Kalamazoo, MI (US); Stuart Miller, St. Kalamazoo, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 82 days.

(21) Appl. No.: 11/546,365

(22) Filed: Oct. 12, 2006

(65) Prior Publication Data

US 2008/0012299 A1    Jan. 17, 2008

Related U.S. Application Data

(60) Provisional application No. 60/726,195, filed on Oct. 14, 2005.

(51) Int. Cl.
    *F16L 33/00* (2006.01)
(52) U.S. Cl. .................. 285/242; 285/398
(58) Field of Classification Search .......... 285/242, 285/252, 254, 255, 397, 921, 260, 398
    See application file for complete search history.

(56) References Cited

U.S. PATENT DOCUMENTS

| 601,683 | A | * | 4/1898 | Smith | 285/254 |
|---|---|---|---|---|---|
| 2,452,643 | A | * | 11/1948 | Fields | 206/364 |
| 2,766,804 | A | * | 10/1956 | Kaiser | 29/237 |
| 3,831,629 | A | * | 8/1974 | Mackal et al. | 137/843 |
| 3,891,250 | A | * | 6/1975 | Oetiker | 285/242 |
| 4,152,821 | A | * | 5/1979 | Scott | 29/421.1 |
| 4,699,404 | A | * | 10/1987 | Drevs | 285/244 |
| 4,775,171 | A | * | 10/1988 | Marshall | 285/101 |
| 4,775,172 | A | * | 10/1988 | Sauer | 285/148.14 |
| 4,775,173 | A | * | 10/1988 | Sauer | 285/148.14 |
| 4,776,369 | A | * | 10/1988 | Lardner et al. | 137/515.5 |
| 5,228,721 | A | * | 7/1993 | Whittle et al. | 285/23 |
| 5,284,368 | A | * | 2/1994 | Oetiker et al. | 285/81 |
| 5,322,331 | A | * | 6/1994 | Waldschmidt et al. | 285/259 |
| 5,718,462 | A | * | 2/1998 | Woods | 285/236 |

(Continued)

FOREIGN PATENT DOCUMENTS

EP    1 433 991 A1    6/2004

(Continued)

*Primary Examiner*—Aaron M Dunwoody
(74) *Attorney, Agent, or Firm*—Crowell & Moring LLP

(57) ABSTRACT

A connector assembly includes first and second hoses, a tubular connector, and a clamp. The tubular connector includes first and second radial projections that are spaced apart along an axial direction of the tubular connector. The tubular connector extends into the first hose, and the first radial projection of the tubular connector engages with the inner surface of the first hose. The tubular connector also extends into the second hose, and the second radial projection of the tubular connector engages with the inner surface of the second hose. The first hose extends into the second hose so that the first and second hoses axially overlap in an area between the first and second radial projections of the tubular connector. The clamp engages the outer surface of the second hose in the axially overlapping area of the first and second hoses to clamp the first and second hoses to the tubular connector.

14 Claims, 1 Drawing Sheet

U.S. PATENT DOCUMENTS 6,019,127 A * 2/2000 Orita et al. .............. 137/515.7
6,155,302 A * 12/2000 Fischerkeller et al. ....... 138/109
6,155,610 A * 12/2000 Godeau et al. .............. 285/242
6,874,822 B2 * 4/2005 Yasuda et al. .............. 285/242
2003/0230895 A1 12/2003 Brown et al.

FOREIGN PATENT DOCUMENTS

FR 2 815 694 A1 4/2002
GB 24116 4/1910

* cited by examiner

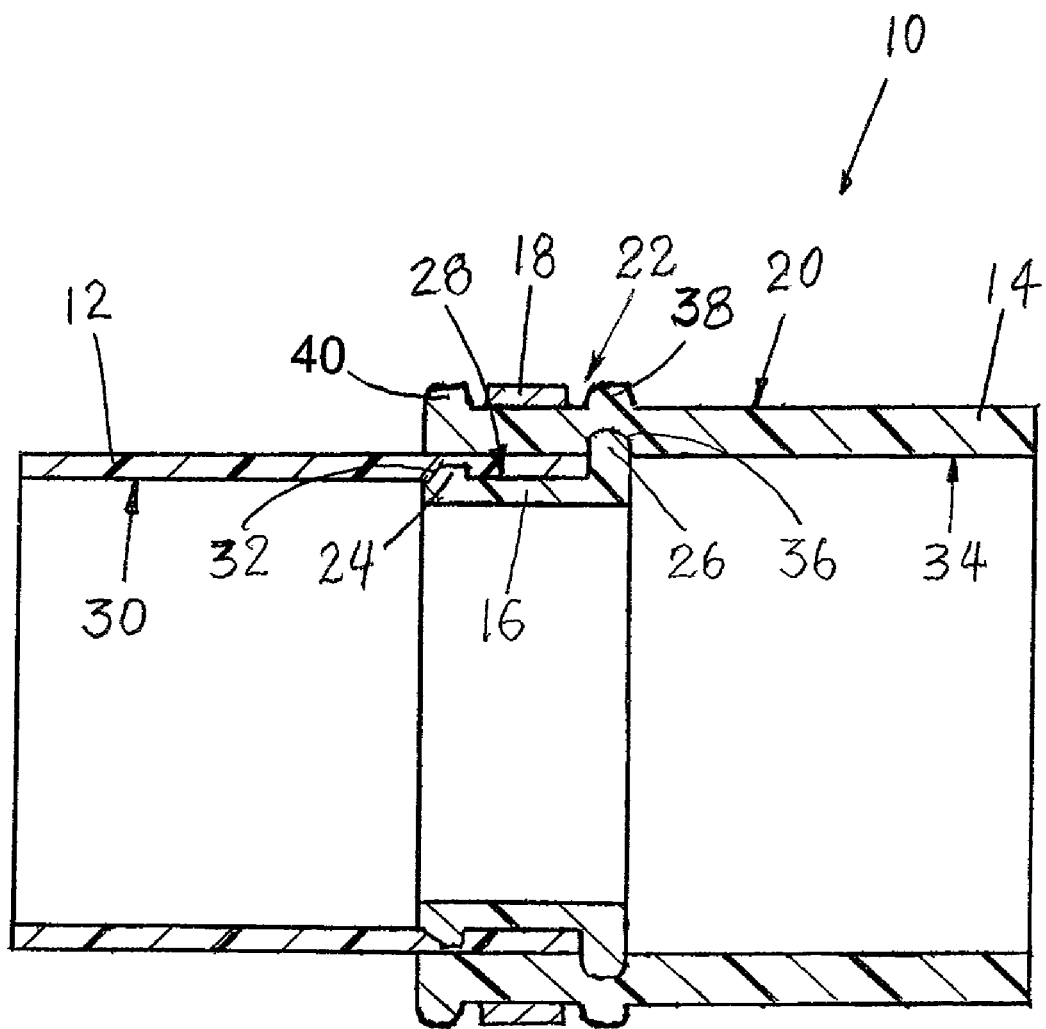
FIGURE

CONNECTOR ASSEMBLY AND METHOD FOR CONNECTING HOSES

FIELD OF THE INVENTION

The present invention relates to a connector assembly for connecting hoses and a method for connecting hoses.

BACKGROUND OF THE INVENTION

In automotive applications, the air cleaning system includes at least three subassemblies: a dirty air duct assembly, an air filter assembly, and a clean air duct assembly. The three subassemblies can be constructed from a variety of materials, such plastic, rubber, and fabric materials.

When the subassemblies are connected to each other, connections are made between similar or dissimilar materials. For example, a flexible rubber hose can be clamped onto a connector of a hard plastic air filter housing. A hard rubber duct can be snap-fitted onto a hard plastic air filter housing. These types of connections are generally secure and durable. However, it is more difficult to connect flexible hoses to each other. For example, a flexible rubber hose and a fabric hose, which are to be connected, do not have sufficient structural rigidity to allow the use of a clamp.

A traditional solution to the problem of connecting two flexible hoses is the use of a hard hose connector and two clamps that clamp the hoses to the hose connector. This solution provides a high level of structural durability, but is relatively expensive because it requires the use of at least three parts. Another solution is to use adhesive or staples. Although this method is less expensive, it also has poor structural durability, resulting in a short service life, especially when engine vibrations create large oscillatory movements of the hoses.

SUMMARY OF THE INVENTION

The present invention provides a connection assembly for two flexible hoses and a method of connecting two flexible hoses, which are more secure and durable than the prior art hose connection using adhesive and staples, but is less expensive than the prior art hose connection using a hard hose connector and two clamps.

In accordance with one aspect of the invention, a connector assembly for connecting two flexible hoses includes a tubular connector and a clamp. The tubular connector includes first and second radial projections that are spaced apart along an axial direction of the tubular connector. The tubular connector extends into the first hose, and the first radial projection of the tubular connector engages with an inner surface of the first hose. The tubular connector extends also into the second hose, and the second radial projection of the tubular connector engages with an inner surface of the second hose. Furthermore, the first hose extends into the second hose so that the first and second hoses axially overlap in an area between the first and second radial projections of the tubular connector. The clamp engages an outer surface of the second hose in the axially overlapping area of the first and second hoses to clamp the first and second hoses to the tubular connector.

In accordance with another aspect of the invention, a connector assembly includes a first hose having an inner surface, a second hose having inner and outer surfaces, a tubular connector, and a clamp. The tubular connector includes first and second radial projections that are spaced apart along an axial direction of the tubular connector. The tubular connector extends into the first hose, and the first radial projection of the tubular connector engages with the inner surface of the first hose. The tubular connector extends into the second hose, and the second radial projection of the tubular connector engages with the inner surface of the second hose. Furthermore, the first hose extends into the second hose so that the first and second hoses axially overlap in an area between the first and second radial projections of the tubular connector. The clamp engages the outer surface of the second hose in the axially overlapping area of the first and second hoses to clamp the first and second hoses to the tubular connector.

In each of the above two embodiments, at least one of the inner surface of the first hose and the inner surface of the second hose may include an indentation to receive the corresponding radial projection of the tubular connector. Additionally, at least one of the tubular connector's first and second radial projections may extend circumferentially along the tubular connector's outer surface to form a circular projection. In this case, the corresponding indentation on the inner surface of a hose may be a circular groove for receiving the corresponding circular projection of the tubular connector. Moreover, the second hose preferably includes two radial projections on its outer surface, and the clamp preferably engages the outer surface of the second hose between the two radial projections. Each of the radial projections of the second hose may extend circumferentially along the second hose's outer surface to form a circular projection.

In accordance with a further aspect of the invention, a method of connecting first and second hoses includes (1) extending a tubular connector into the first hose so that a first radial projection of the tubular connector engages with an inner surface of the first hose; (2) extending the tubular connector into the second hose so that a second radial projection of the tubular connector engages with an inner surface of the second hose; (3) extending the first hose into the second hose so that the first and second hoses axially overlap in an area between the first and second radial projections of the tubular connector; and (4) engaging a clamp with an outer surface of the second hose in the axially overlapping area of the first and second hoses to clamp the first and second hoses to the tubular connector.

The present invention has various advantages. For example, when compared with the prior art hose connection that requires a hard hose connector and two clamps, a connector assembly of the present invention is less expensive because one hose connector and only one clamp are required. When compared with the prior art hose connection that uses adhesive or staples, a connector assembly of the present invention is more secure and durable.

Other objects, advantages and novel features of the present invention will become apparent from the following detailed description of the invention when considered in conjunction with the accompanying drawings.

BRIEF DESCRIPTION OF THE DRAWINGS

The FIGURE shows a cross-section view of a connector assembly of the present invention.

DETAILED DESCRIPTION OF PREFERRED EMBODIMENTS

The FIGURE illustrates a connector assembly 10 for connecting a first hose 12 and a second hose 14. The connector assembly 10 includes a tubular connector 16 and a clamp 18. The tubular connector 16 extends into the first hose 12 and the second hose 14, and the first hose 12 extends into the second hose 14 so that the first and second hoses 12, 14 axially overlap. The clamp 18 engages the outer surface 20 of the second hose 14 in the axially overlapping area 22 of the first and second hoses 12, 14 to clamp 18 the first and second hoses 12, 14 to the tubular connector 16.

The tubular connector 16 can be made from any suitable material. Preferably, the material provides the tubular connector 16 with sufficient strength to withstand the clamping force and to provide a secure connection between the first and second hoses 12, 14. Suitable materials for the tubular connector 16 include, for example, plastic and metallic materials. Each of the first and second hoses 12, 14 may also be made from any one or more of several suitable materials, including, for example, rubbers, fabrics and plastic materials.

The tubular connector 16 can be of any suitable configuration. In particular, it can have any suitable diameter and length, and any suitable diameter/length ratio. Preferably, the outer diameter of the tubular connector 16 is slightly less than the inner diameter of the first hose 12 so that it can extend into the first hose 12 and the first hose 12 can be clamped on the tubular connector 16. The length of the tubular connector 16 preferably is sufficiently long to accommodate the clamp 18.

The tubular connector 16 includes first and second projections 24, 26 that extend radially outward from the outer surface 28 of the tubular connector 16. Although it may have any suitable configuration, each of the tubular connector's radial projections 24, 26 preferably extends circumferentially along the tubular connector's outer surface 28 to form a circular projection. Alternatively, each projection 24, 26 may be broadly defined as including one or more beads of any configurations. The cross-section of each radial projection 24, 26 may also be of any suitable configuration, such as a semispherical, conical, rectangular, or trapezoidal configuration. The first and second projections 24, 26 of the tubular connector 16 may be spaced apart along the axial direction of the tubular connector 16. Preferably, the space between the two projections 24, 26 is sufficiently large to accommodate the clamp 18.

The outer diameter of the first hose 12 preferably is slightly less than the inner diameter of the second hose 14, so that the first hose 12 can extend into the second hose 14. Preferably, the inner surface 30 of the first hose 12 includes an indentation 32 that is configured to match the first radial projection 24 of the tubular connector 16 so that the first radial projection 24 can be received in the indentation 32. When the first radial projection 24 of the tubular connector 16 is a circular projection, the indentation 32 on the inner surface 30 of the first hose 12 may be a circular groove to receive the circular projection. When the indentation 32 is engaged with the radial projection 24, relative axial movement between the first hose 12 and the tubular connector 16 can be prevented. Similarly, the inner surface 34 of the second hose 14 may include an indentation 36 to receive the second radial projection 26 of the tubular connector 16. And the discussion on the first pair of indentation 32 and projection 24 applies to this pair of indentation 36 and projection 26. Alternatively, the inner surface 30 of the first hose 12 may not include an indentation. Instead, the first radial projection 24 of the tubular connector 16 may simply be pressed into the inner surface 30 of the first hose 12 by the clamp 18. Similarly, the inner surface of the second hose 14 also may not include an indentation.

The second hose 14 preferably includes two projections 38, 40 that extend radially outwardly from the outer surface 20 of the second hose 14. The clamp 18 preferably engages the outer surface 20 of the second hose 14 between the two radial projections 38, 40. Each of the radial projections 38, 40 of the second hose 14 may extend circumferentially along the second hose's outer surface 20 to form a circular projection. These two projections 38, 40 may be used to keep the clamp 18 in place.

The clamp 18 can be any suitable conventional clamp and will not be described in detail here.

To use a connector assembly 10 of the present invention to connect the first hose 12 and the second hose 14, the tubular connector 16 is first extended into the first hose 12 so that the first radial projection 24 of the tubular connector 16 is engaged with the inner surface 30 of the first hose 12. If the inner surface 30 of the first hose 12 includes an indentation 32 that is configured to match the first radial projection 24 of the tubular connector 16, the first radial projection 24 is placed in the indentation 32. The tubular connector 16 is extended into the second hose 14 so that the second radial projection 26 of the tubular connector 16 is engaged with the inner surface of the second hose 14. If the inner surface of the second hose 14 includes an indentation 36 that is configured to match the second radial projection 26 of the tubular connector 16, the second radial projection 26 is placed in the indentation 36. The first hose 12 is extended into the second hose 14 so that the first and second hoses 12, 14 axially overlap in an area 22 between the first and second radial projections 24, 26 of the tubular connector 16. A clamp 18 is engaged with an outer surface 20 of the second hose 14 in the axially overlapping area 22 of the first and second hoses 12, 14 to clamp 18 the first and second hoses 12, 14 to the tubular connector 16.

The foregoing disclosure has been set forth merely to illustrate the invention and is not intended to be limiting. Since modifications of the disclosed embodiments incorporating the spirit and substance of the invention may occur to persons skilled in the art, the invention should be construed broadly to include all variations within the scope of the appended claims and equivalents thereof.

What is claimed is:

1. A connector assembly for connecting first and second hoses, the connector assembly comprising:

a tubular connector including first and second radial projections that are spaced apart along an axial direction of the tubular connector, wherein the tubular connector extends into the first hose and the first radial projection of the tubular connector engages with an inner surface of the first hose, wherein the tubular connector extends into the second hose and the second radial projection of the tubular connector engages with an inner surface of the second hose, and wherein the first hose extends into the second hose so that the first and second hoses axially overlap in an area between the first and second radial projections of the tubular connector; and a clamp that engages an outer surface of the second hose in the axially overlapping area of the first and second hoses to clamp the first and second hoses to the tubular connector, wherein at least one of the inner surface of the first hose and the inner surface of the second hose includes an indentation to receive the corresponding radial projection of the tubular connector.

2. The connector assembly of claim 1, wherein at least one of the tubular connector's first and second radial projections extends circumferentially along the tubular connector's outer surface to form a circular projection.

3. The connector assembly of claim 2, wherein said indentation is a circular groove to receive the corresponding circular projection of the tubular connector.

4. The connector assembly of claim 1, wherein the clamp engages the outer surface of the second hose between two radial projections of the second hose.

5. A connector assembly comprising:
a first hose having an inner surface;
a second hose having inner and outer surfaces;
a tubular connector including first and second radial projections that are spaced apart along an axial direction of the tubular connector, wherein the tubular connector extends into the first hose and the first radial projection of the tubular connector engages with the inner surface of the first hose, wherein the tubular connector extends into the second hose and the second radial projection of the tubular connector engages with the inner surface of the second hose, and wherein the first hose extends into the second hose so that the first and second hoses axially overlap in an area between the first and second radial projections of the tubular connector; and
a clamp that engages the outer surface of the second hose in the axially overlapping area of the first and second hoses to clamp the first and second hoses to the tubular connector,
wherein at least one of the inner surface of the first hose and the inner surface of the second hose includes an indentation to receive the corresponding radial projection of the tubular connector.

6. The connector assembly of claim 5, wherein at least one of the tubular connector's first and second radial projections extends circumferentially along the tubular connector's outer surface to form a circular projection.

7. The connector assembly of claim 6, wherein said indentation is a circular groove to receive the corresponding circular projection of the tubular connector.

8. The connector assembly of claim 5, wherein the second hose includes two radial projections on the outer surface of the second hose, and wherein the clamp engages the outer surface of the second hose between the two radial projections of the second hose.

9. The connector assembly of claim 8, wherein at least one of the second hose's two radial projections extends circumferentially along the second hose's outer surface to form a circular projection.

10. A method of connecting first and second hoses, the method comprising:
extending a tubular connector into the first hose so that a first radial projection of the tubular connector engages with a corresponding indentation provided in an inner surface of the first hose;
extending the tubular connector into the second hose so that a second radial projection of the tubular connector engages with an inner surface of the second hose;
extending the first hose into the second hose so that the first and second hoses axially overlap in an area between the first and second radial projections of the tubular connector; and
engaging a clamp with an outer surface of the second hose in the axially overlapping area of the first and second hoses to clamp the first and second hoses to the tubular connector.

11. The method of claim 10, wherein the step of extending the tubular connector into the second hose is practiced by
extending the tubular connector into the second hose so that a second radial projection of the tubular connector engages with a corresponding indentation provided in an inner surface of the second hose.

12. the method of claim 11, wherein
in the step of extending a tubular connector into the first hose, the indentation is a circular groove provided in inner surface of the first hose; and wherein
in the step of extending the tubular connector into the second hose, the indentation is a circular groove provided in inner surface of the second hose.

13. The connector assembly of claim 5, wherein
said first radial projection and said second radial projection are circular projections;
wherein said at least one indentation is a first and a second circular groove, said first circular groove provided on said inner surface of said first hose, said second circular groove provided on said inner surface of said second hose;
wherein said first circular groove in said first hose is configured to match said first radial projection of said tubular connector; and
wherein said second circular groove in said second hose is configured to match said second radial projection of said tubular connector.

14. The connector assembly of claim 13, further comprising:
a third and a fourth radial projection formed on an outer surface of said second hose, said third and fourth radial projections axially spaced to receive said clamp therebetween.

* * * * *